US009844912B2

(12) United States Patent
Hemingway et al.

(10) Patent No.: US 9,844,912 B2
(45) Date of Patent: Dec. 19, 2017

(54) CONNECTORS MANUFACTURED BY THREE-DIMENSIONAL PRINTING

(71) Applicant: A. RAYMOND ET CIE, Grenoble (FR)

(72) Inventors: Todd L. Hemingway, Metamora, MI (US); Nicholas Jackson, Davisburg, MI (US)

(73) Assignee: A. Raymond et Cie, Grenoble (FR)

( * ) Notice: Subject to any disclaimer, the term of this patent is extended or adjusted under 35 U.S.C. 154(b) by 932 days.

(21) Appl. No.: 14/091,784

(22) Filed: Nov. 27, 2013

(65) Prior Publication Data

US 2014/0084583 A1     Mar. 27, 2014

Related U.S. Application Data

(63) Continuation of application No. PCT/US2012/039432, filed on May 24, 2012.
(Continued)

(51) Int. Cl.

| B29C 67/00 | (2017.01) |
| B33Y 10/00 | (2015.01) |
| F16L 37/098 | (2006.01) |
| F16L 21/00 | (2006.01) |
| F16L 37/02 | (2006.01) |
| B29C 64/106 | (2017.01) |
| B29C 64/112 | (2017.01) |

(Continued)

(52) U.S. Cl.
CPC ........ *B29C 67/0059* (2013.01); *B29C 64/106* (2017.08); *B29C 64/112* (2017.08); *B29C 64/124* (2017.08); *B33Y 10/00* (2014.12); *F16L 21/00* (2013.01); *F16L 37/02* (2013.01); *F16L 37/0982* (2013.01); *B33Y 80/00* (2014.12)

(58) Field of Classification Search
CPC ............ B29C 67/0055; B29C 67/0059; B29C 67/0062; B33Y 80/00; B33Y 10/00; E03C 1/021; B29L 2031/246
See application file for complete search history.

(56) References Cited

U.S. PATENT DOCUMENTS

| 5,074,601 A | 12/1991 | Spors et al. |
| 5,090,747 A | 2/1992 | Kotake |

(Continued)

FOREIGN PATENT DOCUMENTS

| CN | 2900196 Y | 5/2007 |
| DE | 102006062373 A1 | 6/2008 |

(Continued)

OTHER PUBLICATIONS

Brain, Marshall; "How Stereolithography 3-D Layering Works," HowStuffWorks.com., http://www.howstuffworks.com/stereolith.htm; article, Oct. 5, 2000, 6 pages.

(Continued)

Primary Examiner — Stella Yi
(74) Attorney, Agent, or Firm — Harness, Dickey & Pierce, PLC

(57) ABSTRACT

A hollow conduit is provided. In another aspect, a quick connector, suitable to carry fluid therethrough, is made of layers of material, a light curable material and/or multiple built-up materials. Another aspect uses a three-dimensional printing machine to emit material from an ink jet printing head to build up a conduit.

59 Claims, 5 Drawing Sheets

Related U.S. Application Data

(60) Provisional application No. 61/492,498, filed on Jun. 2, 2011.

(51) Int. Cl.
  *B29C 64/124* (2017.01)
  *B33Y 80/00* (2015.01)

(56) References Cited

U.S. PATENT DOCUMENTS

| | | | |
|---|---|---|---|
| 5,126,529 A | 6/1992 | Weiss et al. | |
| 5,345,391 A * | 9/1994 | Hull | B29C 67/0062 |
| | | | 156/273.3 |
| 5,542,717 A | 8/1996 | Rea et al. | |
| 5,653,475 A | 8/1997 | Scheyhing et al. | |
| 5,866,058 A | 2/1999 | Batchelder et al. | |
| 5,924,746 A | 7/1999 | Fixemer | |
| 5,941,577 A | 8/1999 | Musellec | |
| 6,082,779 A | 7/2000 | Lesser et al. | |
| 6,155,612 A | 12/2000 | Szabo | |
| 6,173,998 B1 | 1/2001 | Bock | |
| 6,231,089 B1 | 5/2001 | DeCler et al. | |
| 6,318,764 B1 | 11/2001 | Trede et al. | |
| 6,371,529 B1 | 4/2002 | Szabo et al. | |
| 6,428,055 B1 | 8/2002 | Moretti et al. | |
| 6,612,622 B2 | 9/2003 | Andre et al. | |
| 6,905,143 B2 | 6/2005 | Klinger et al. | |
| 7,029,036 B2 | 4/2006 | Andre | |
| 7,341,282 B2 | 3/2008 | Moretti et al. | |
| 7,369,915 B2 | 5/2008 | Kritchman et al. | |
| 7,537,247 B2 | 5/2009 | Trede et al. | |
| 7,770,938 B2 | 8/2010 | Bauer | |
| 7,851,122 B2 | 12/2010 | Napadensky | |
| 8,033,575 B2 | 10/2011 | Tsurumi | |
| 2001/0048225 A1 | 12/2001 | Andre et al. | |
| 2003/0013047 A1 | 1/2003 | Tani | |
| 2003/0137148 A1 | 7/2003 | Andre et al. | |
| 2003/0178844 A1 | 9/2003 | Klinger et al. | |
| 2007/0040377 A1 | 2/2007 | Moretti et al. | |
| 2008/0111372 A1 | 5/2008 | Trede et al. | |
| 2010/0217429 A1 | 8/2010 | Kritchman et al. | |
| 2010/0284732 A1 | 11/2010 | Nakamura | |
| 2011/0074065 A1 | 3/2011 | Batchelder et al. | |
| 2011/0285052 A1 | 11/2011 | Wigand et al. | |
| 2012/0033002 A1 | 2/2012 | Seeler et al. | |
| 2012/0200081 A1 | 8/2012 | Reznar et al. | |

FOREIGN PATENT DOCUMENTS

| | | |
|---|---|---|
| EP | 1873439 A2 | 1/2008 |
| EP | 2156942 A1 | 2/2010 |
| JP | 2000006249 A | 1/2000 |
| JP | 2002347124 A | 12/2002 |
| JP | 2002347127 A | 12/2002 |
| JP | 2004125166 A | 4/2004 |
| WO | WO-2007/130294 A2 | 11/2007 |

OTHER PUBLICATIONS

"Keeping AP Racing on Track," Objet Geometries Ltd., printout, www.2objet.com, (2007), 2 pages.

"PolyJet Matrix™ Technology," Objet Geometries Ltd.; brochure, (2009), 6 pages.

Leno, Jay; "Jay Leno's 3D Printer Replaces Rusty Old Parts," Popular Mechanics, http://www.popularmechanics.com/cars/jay-leno/technology/4320759, Jun. 8, 2009, 3 pages.

"A Factory on Your Desk," The Economist Technology Quarterly, article, Sep. 5, 2009, pp. 26-29.

"Connex500, The First Multi-Material 3-Dimensional Printing System", Objet Geometries Ltd., article, (2010), 2 pages.

"EOS in brief; e-Manufacturing Solutions," EOS Worldwide, brochure (2010).

"Make Your Ideas Real—Give Your Creativity A New Dimension, dimension 3D Printers," Stratasys, company brochure, (2010) 73 pages, Stratasys Document #204400-0002.

"The Power of Two, Case Study," Objet Geometries Ltd., printout, www.objet.com, (2010), 2 pages.

Pettis, Bre; "Using Makerbot for Dishwasher Repair," http://www.makerbot.com/blog/2010/08/05/using-makerbot-for-dishwasher-repair, Aug. 5, 2010, four pages.

"Automotive," Objet Geometries, Inc., article, http://www.objet.com/INDUSTRIES/Automotive, Sep. 12, 2010, 1 page.

Evans, C.; "What is Rapid Prototyping?" XP002681573, http://www.articlesbase.com/industrial-articles/what-is-rapid-prototyping-3699771.html; Nov. 11, 2010; 1 page.

"Print me a Stradivarius," The Economist, Feb. 12, 2011, p. 11.

"The Printed World," The Economist, Feb. 12, 2011, pp. 69-71.

"Laser sintering—versatile production of tooling inserts, prototype parts and end products from metal powder," International Powder Metallurgy Directory, http://www.ipmd.net/articles/articles/001087.html, Jan. 12, 2011, downloaded Apr. 1, 2011.

EOS e-Manufacturing Solutions, brochure, EOS GmbH Electro Optical Systems, downloaded from internet Apr. 1, 2011, www.eos.info.

EOSINT S 750 product brochure, "Double laser-sintering system for the direct, tool-less production of sand cores and moulds for metal castings" downloaded from internet Apr. 1, 2011, http://img.directindustry.com/pdf/repository_di/5078/eosint-s-750-21926_1b.jpg.

"Digitalized e-Manufacturing workflows: Direct Metall Laser-Sintering technology enables high quality parts, cost efficiency and time savings", press release Mar. 22, 2011, EOS Electro Optical Systems Gmbh, downloaded from internet Apr. 1, 2011, http://www.eos.info/en/news-events/press-releases/pressdetails/article/103/digitalisier.html.

Rao. M.; Webcourse publication IIT-Delhi/Computer Aided Design & Manufacturing II—Module G(4): Rapid Prototyping (Apr. 18, 2011).

"Consumer Goods," Case Study, Objet Geometries Ltd., printout, May 5, 2011, http://objet.com/INDUSTRIES/consumer_Goods/.

"Objet. The Power to Create. Jaguar Land Rover," 3Dprinting & Rapid Prototyping by Objet Geometries Ltd., printout, <http://www.object.com>/, May 31, 2011.

"Stereolithography," Wikipedia, http://en.wikipedia.org/wiki/Stereolithography; article, last modified Jun. 1, 2011, 5 pages.

"3D Printing," Wikipedia, http://en/wikipedia.org/wiki/3D_printing, article, last modified Jun. 20, 2011, 5 pages.

* cited by examiner

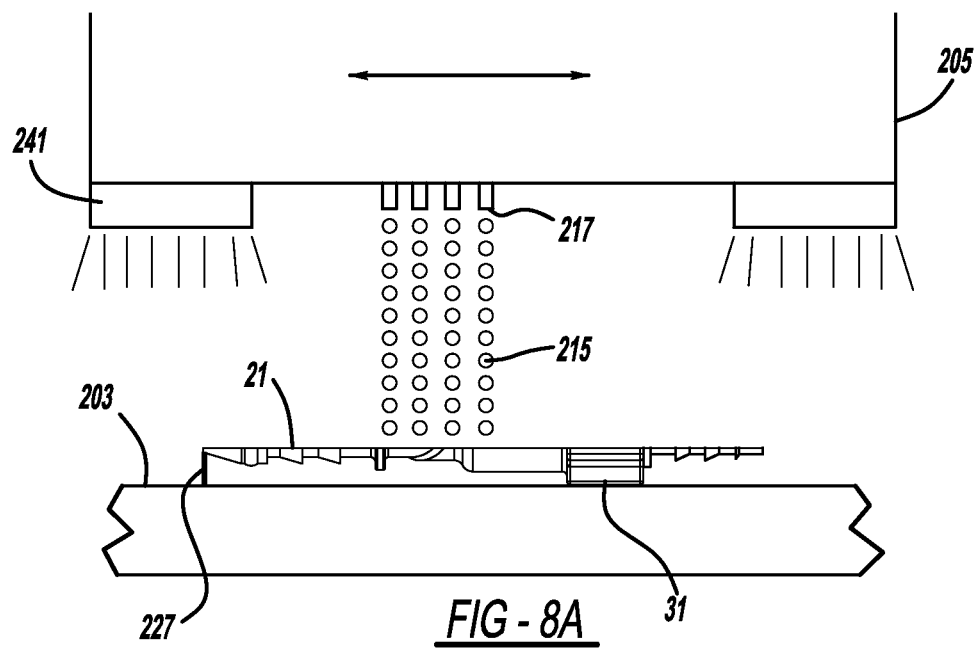
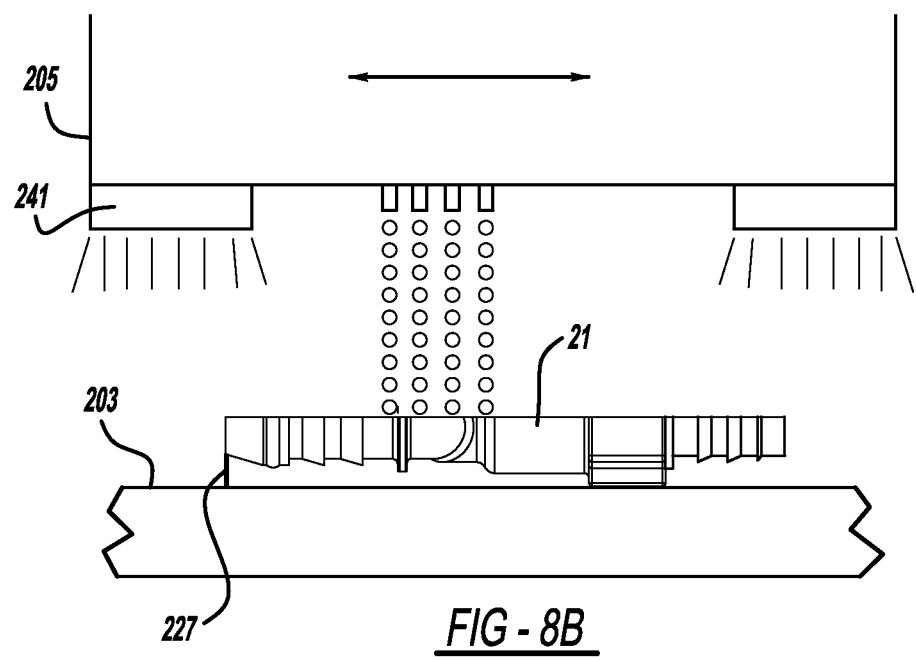

CONNECTORS MANUFACTURED BY THREE-DIMENSIONAL PRINTING

CROSS-REFERENCE TO RELATED APPLICATIONS

This application is a continuation of International Patent Application Serial No. PCT/US2012/039432, filed on May 24, 2012, which claims priority to U.S. Provisional Patent Application Ser. No. 61/492,498, filed on Jun. 2, 2011, both of which are incorporated by reference herein.

BACKGROUND AND SUMMARY

The present invention relates generally to conduits and more particularly to manufacturing of a fluid carrying connector.

Traditionally, polymeric parts are made by injection or extrusion molding. In such processes, a heated polymeric liquid is inserted into match metal dies under high pressure, after which the dies are internally cooled in order to cure the manufactured parts. Air is vented from the die cavity when the molten polymer is injected therein. Injection and extrusion molding are ideally suited for high volume production where one hundred thousand or more parts per year are required. These traditional manufacturing processes, however, disadvantageously require very expensive machined steel dies, which are difficult and time consuming to modify if part revisions are desired, and are subject to problematic part-to-part tolerance variations. Such variations are due to molding shrinkage during curing, molding pressure differences, part warpage due to internal voids and external sink marks, and the like. The expense of this traditional die tooling makes lower volume production of polymeric parts prohibitively expensive.

It is also known to use stereolithography to produce non-functional polymeric parts. Such conventional stereolithography methods use a laser to create a layered part on a moving platform within a vat of liquid polymer. The part rises from the liquid as it is being made. These parts are extremely slow to produce and impractically brittle.

In accordance with the present invention, a hollow conduit is provided. In another aspect, a quick connector, suitable to carry fluid therethrough, is made of layers of material, a light curable material and/or multiple built-up materials. Another aspect uses a three-dimensional printing machine to emit material from an ink jet printing head to build up a conduit. A further aspect provides a method of making a conduit by depositing material in layers and/or a built-up arrangement. Yet another aspect makes a conduit by depositing material in an environment where the conduit is essentially surrounded by a gas, such as air, during the material deposition. A method of making a retainer, male insert and/or integral seal with a conduit or connector is also employed in another aspect.

The present connector and method are advantageous over traditional devices. For example, the present connector and method do not require any unique tooling or dies, thereby saving hundreds of thousands of dollars and many weeks of die manufacturing time. Furthermore, the present method allows for quick and inexpensive design and part revisions from one manufacturing cycle to another. In another aspect, part-to-part tolerance variations are essentially non-existent with the present connector and method such that at least ten, and more preferably at least forty, identical connectors can be produced in a single machine manufacturing cycle. For other aspects of the present connector and method, multiple head openings, a stationary support for the built-up connectors within the machine, and the ambient air manufacturing environment allow for increased manufacturing speed, simpler machinery and ease of access to the manufactured connectors. It is also noteworthy that the present connector and method are advantageously capable of creating die-locked part configurations that would otherwise be prohibitively expensive, if not impossible, to produce with conventional dies. In other aspects, the present connector and method reduce post-manufacturing assembly by creating mating parts in a pre-installed or pre-assembled condition within the same manufacturing machine cycle; for example, this can apply to retainers, male inserts and/or seals. Materials of different characteristics, such as flexibility, tensile strength, hoop strength, chemical resistance, UV fade resistance, or even color can be deposited to create different sections of the connector at essentially the same time. Thus, internal seals can be integrally created and attached in a hard to reach area of an internal bore of the connector without requiring specialized insertion tools, adhesive or other expensive and variable post-manufacturing assembly that would otherwise be required using traditional processes. Additional advantages or features of the present invention can be found in the following description and appended claims as well as in the accompanying drawings.

BRIEF DESCRIPTION OF THE DRAWINGS

FIGS. 8A-C are a series of diagrammatic side views showing the machine building up the first embodiment connectors.

DETAILED DESCRIPTION

Figures 1, 2:
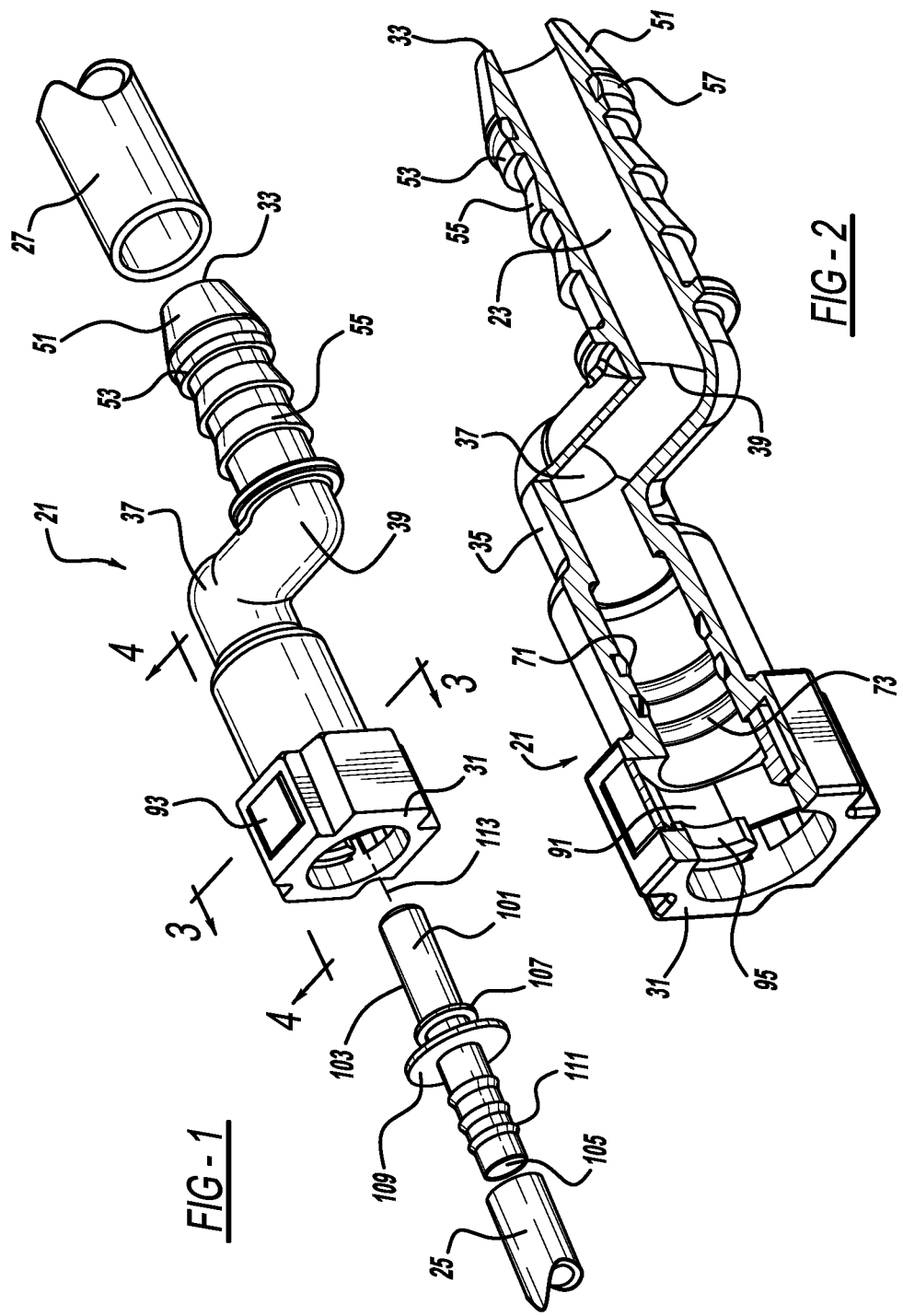
FIG. 1 is an exploded perspective view showing a first embodiment of the present connector.
FIG. 2 is a partially fragemented, perspective view showing the connector of FIG. 1.
Figure 3:
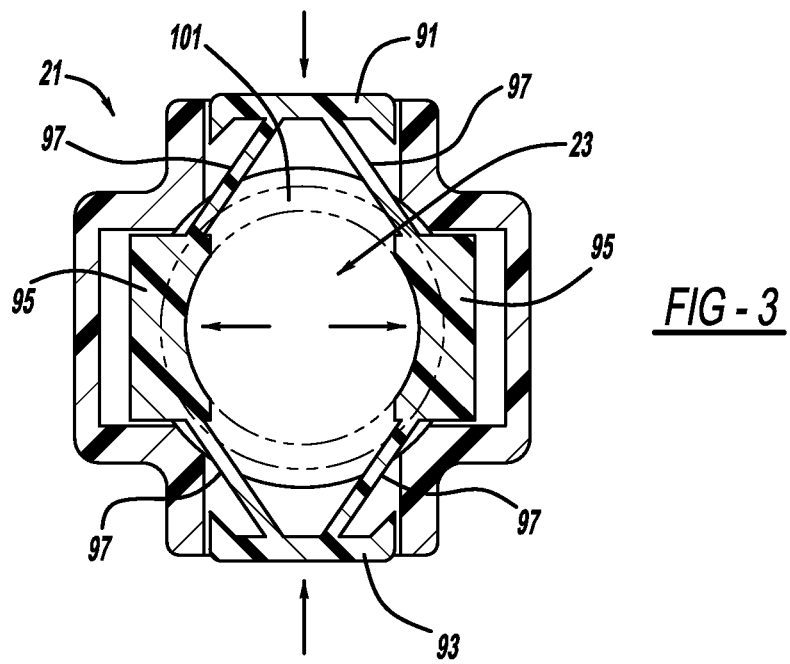
FIG. 3 is a cross-sectional view taken along line 3-3 of FIG. 1, showing the connector.
Figure 4:
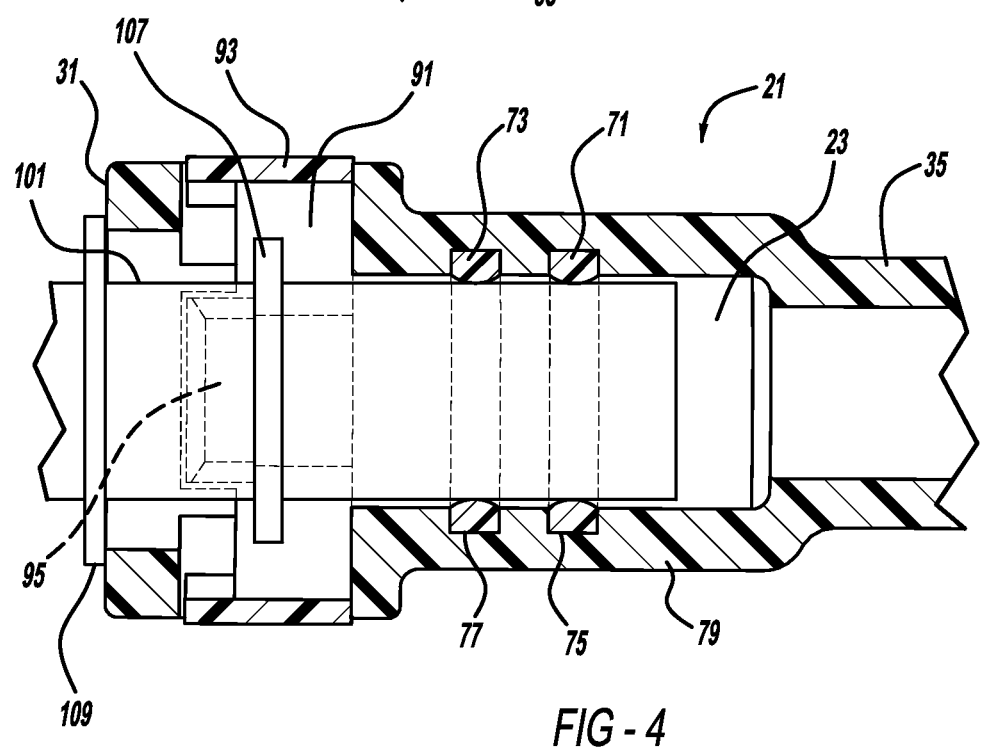
FIG. 4 is a longitudinal sectional view, taken along line 4-4 of FIG. 1, showing the connector.

A first preferred embodiment conduit, and more particularly a quick connector 21, operable to carry a fluid through a hollow bore 23 therein is illustrated in FIGS. 1-4. For example, connector 21 can be employed in an automotive vehicle to connect multiple air conditioning, brake fluid or fuel tubes wherein the liquid or gaseous fluid flows through bore 23 bridging between the coupled tubes. Connector 21 may also be employed in industrial, laboratory or residential buildings to connect tubes carrying water, air or other fluids therebetween. Exemplary tubes 25 and 27 are shown in FIG. 1, and the term "tube" as used herein should be construed in the broadest reasonable manner and is preferably a flexible, hollow and elongated polymeric member but can alternately be a rigid polymeric, metallic or composite pipe or the like.

Connector 21 includes an enlarged female end 31 and a reduced male end 33. An elongated middle or body 35 extends between ends 31 and 33. A section at male end 33 has a cross-sectional dimension smaller than a nominal cross-section through body 35 and a section at female end 31. Body 35 and the associated bore include a pair of opposite and generally right angle bends 37 and 39, although it should be appreciated that an alternate quantity, angle, and shape of the bends can be used. For example, the bends may alternately have 60° angles or may create a U-shape. Regardless, such a multiple bend configuration would create a difficult to manufacture die-lock condition with conventional injection molding which is avoided with the present process.

Male end 33 has a generally frusto-conical taper 51, a circular flange 53 and a pair of frusto-conically tapered barbs 55 on an outer surface thereof. These formations all have varying thickness but do not cause internal shrinkage voids or depressed sink marks due to use of the present manufacturing process as will be discussed in greater detail hereinafter. An externally mounted O-ring seal 57 is located within a groove between taper 51 and flange 53 for sealing against an internal surface of mating tube 27. An optional cir-clip or other compressive yet removeable retainer can be externally applied to tube 27 after it is mounted onto male end 33, wherein tube 27 is clamped between the retainer and barbs 55.

A pair of O-ring seals 71 and 73 are internally located within corresponding grooves 75 and 77, respectively, of the cylindrical wall surrounding bore 23. Furthermore, a flexible retainer 91 is mounted within an enlarged chamber of female end 31. Retainer 91 includes a pair of externally accessible buttons 93 connected to a pair of laterally moveable snap-fit barbs 95 by diagonally bridging arms 97. Each snap-fit barb 95 is arcuate when viewed from an end, and is also tapered with a greater diameter closest to the opening in female end 31. Thus, insert forces are less than extraction forces for an internally mating insert or tube.

A male insert 101 is a rigid, alongated and hollow tubular member having a generally cylindrical outside surface 103 through which extends a bore 105. A circular engagement flange 107 and a circular abutment stop 109 laterally extend from surface 103 of male insert 101. Furthermore, multiple peaks 111 surround surface 103 so as to securely engage an inside of tube 25 when it surrounds the corresponding segment of male insert 101. An external retainer may optionally be employed to further secure tube 25 onto male insert 101. Male insert 101 is linearly inserted into or created inside of female end 31 of connector 37 such that stop 109 of male insert 101 is abutted against end 31 and engagement flange 107 is snap-fit coupled to barbs 95 of retainer 91. This prevents undesired removable of male insert 101 from connector 21 while fluid flows therebetween at fluid pressures of at least five bar, and withstanding at least 200 pounds of extraction force therebetween without failure. However, when it is desired to remove male insert 101 from connector 21, a person pushes buttons 93 toward an axial centerline 113 while pulling out male insert 101; the inward button compression serves to laterally expand barbs 95 away from centerline 113 as is illustrated by the arrows in FIG. 3. Male insert 101 can then be reinserted in a linear and low effort, quick connect and snap-fit manner.

It should be appreciated that alternate configurations of quick connector conduits can be employed but using the presently preferred manufacturing method: Exemplary alternative configurations are disclosed in U.S. patent application Ser. No. 13/023,735 entitled "Connector Apparatus" which was filed on Feb. 9, 2011, and U.S. Pat. No. 7,537,247 entitled "Locking Part For a Rapid Coupling" which issued to Tredy et al. on May 26, 2009. Both of these are incorporated by reference herein.

Figure 5:
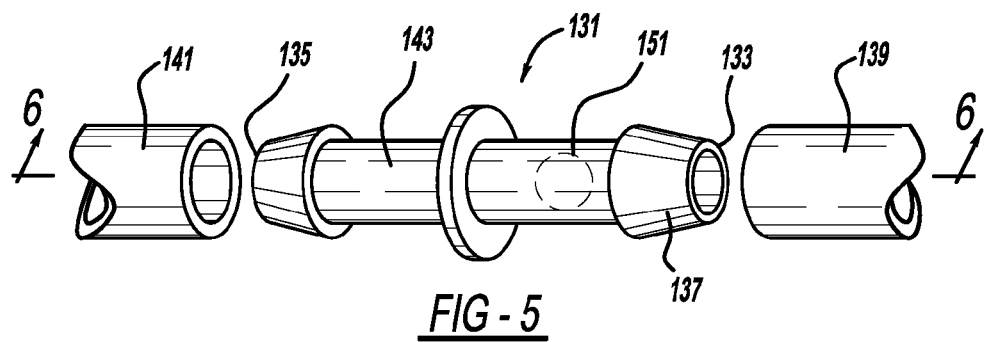
FIG. 5 is an exploded perspective view showing a second embodiment of the present connector.
Figure 6:
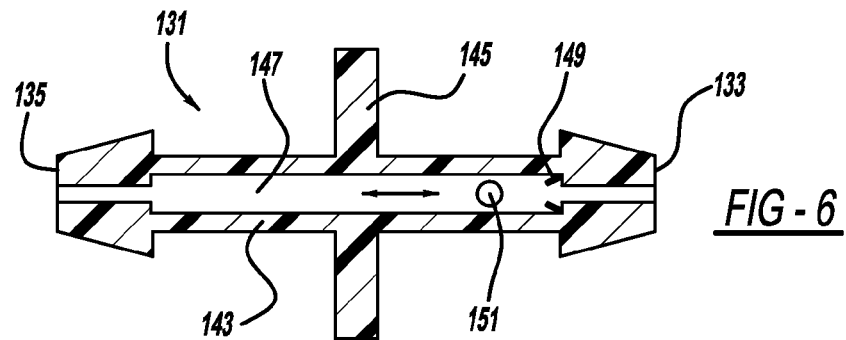
FIG. 6 is a longitudinal sectional view, taken along line 6-6 of FIG. 5, showing the connector.

Referring to FIGS. 5 and 6, a second preferred embodiment fluid carrying conduit, is a quick connector check valve 131. Connector valve 131 has a pair of male ends 133 and 135 with frusto-conical tapers 137 on external surfaces thereof. Female tubes 139 and 141 are secured around each respective male end 133 and 135 so that fluid can flow therebetween. A middle or body 143 is elongated between ends 133 and 135, and has a relatively thicker circular flange 145 laterally extending therearound. A hollow throughbore 147 extends between ends 133 and 135 but has a greater diameter within body 143 than it does within the frusto-conical ends. Two or three locally projecting and spaced apart fingers 149 diagonally project from one end into bore 147. A spherical ball 151 is created within the single piece connector valve 131 and is linearly moveable (while possibly rotating) within bore 147 between ends 133 and 135. When fluid flows from end 135 to end 133, ball 151 is pushed onto fingers 149. The lateral space between the circumference of ball 151 and an interior surface of body 143, as well as the spaced apart fingers 149, allow fluid to flow past ball 151 and exit end 133. In a reverse flow direction, however, ball 151 moves from end 133 to end 135 and blocks the outlet adjacent end 135 thereby preventing a backflow condition. The restricted openings in ends 133 and 135 prevent ball 151 from being removed from connector valve 131. Thus, ball 151 acts as a moveable valve member in selectively controlling the flow direction through connector valve 131.

Figure 7:
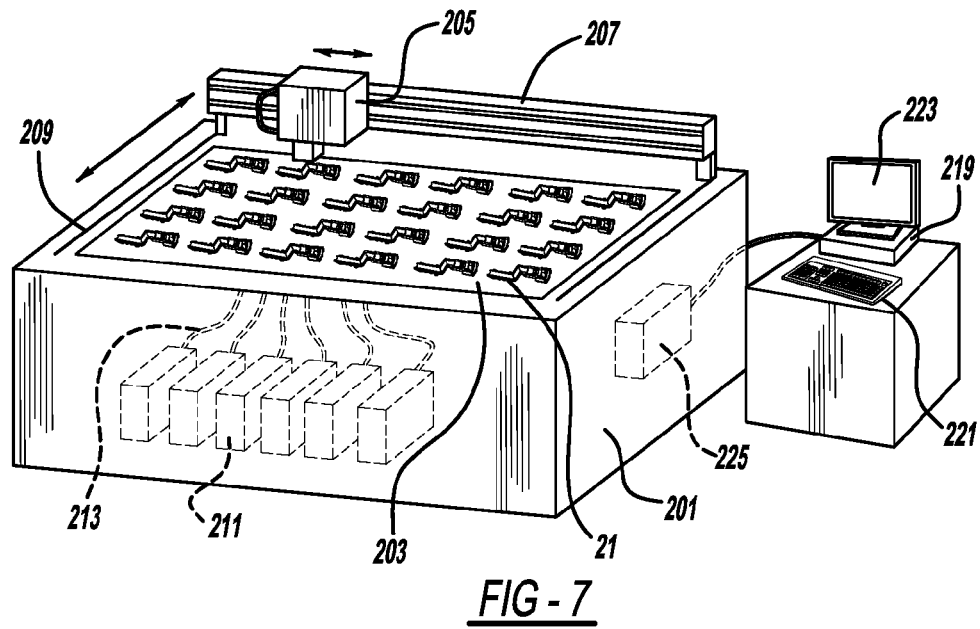
FIG. 7 is a perspective view showing a machine manufacturing the first embodiment connectors, with an upper cover of the machine removed.
Figure 8C:
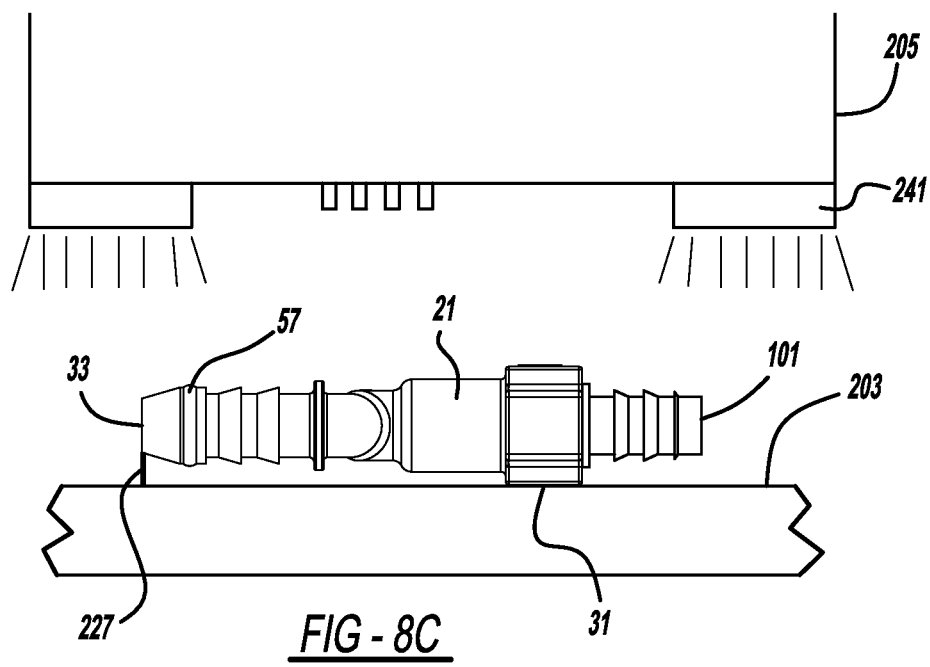

The preferred manufacturing machine and process are shown in FIGS. 7-8C. A three-dimensional printing machine 201 includes a stationary support surface 203 upon which a set of identical connectors 21 are created. Machine 201 further includes at least one ink jet printer head 205, and preferably eight heads, which traverse side to side along one or more gantry rails 207 by an electric motor or other automatically controlled actuators. The gantry rail also moves fore and aft above support surface 203 along outboard tracks 209, driven by an electric motor or other automatically controlled actuator. At least two storage tanks 211 or removable cartridges are connected to head 205 via supply hoses 213 in order to feed the same or different polymeric materials 215 contained within each tank 211 to multiple ink jet printer openings 217 in head 205. Openings 217 may constitute an array of 10×10 or even 100×100 nozzles, and more preferably 96 nozzles, arranged in a linear array such that multiple material flows are simultaneously emitted during a single head pass. The material is preferably an ultra violet light-curable photopolymer in the form of a powder and water mixture. Alternately, a spool containing an elongated and flexible string or filament of the polymeric material can be fed to the head, melted and emitted onto the support surface as a layered and continuous string.

A computer controller 219, having an input keyboard 221, an output display screen 223, and a microprocessor, is connected to a central processing unit 225 of machine 201 to control the feed of material from tanks 211 and the actuator movement of head 205 relative to support surface 203. The machine user downloads a CAD file containing a design of the connector into non-transient computer memory, such as RAM, ROM, a hard drive or removeable storage, associated with computer controller 210. The user then uses software instructions stored in the memory to digitally lay out the desired quantity of the connectors 21 onto support surface 203 and position the connectors in a manufacturing orientation, while adding any supports 227 to the design which are later removed after the manufacturing. The user also inputs the material(s) to be used in the manufacturing, whereafter the microprocessor in computer controller 219 and CPU 225 runs the software to cause head 205 to begin its movement and material deposition in order to create the set of connectors.

During the first pass of head 205, ink jet printing openings 217 emit streams of polymeric material 215 and lay down a first layer, constituting a bottom external surface with a first transverse pass of head 205; for the first preferred embodiment connector 21, the bottom external surface as shown is an outside surface of the thickest section which is at female end section 31. This first pass lays down a material thickness of approximately 0.1-1.0 mm of connector 21. As the head continues in its transverse path, it will also lay down the same exact material layer for each adjacent connector being manufactured in the same manufacturing cycle. Alternately, if the array of openings is large enough, spread out or contained on multiple heads, then multiple connectors can be simultaneously deposited. One or more ultra violet lights 241 are attached to head 205 which serve to emit light onto the layered material immediately after its deposition which binds together and cures the layer of material deposited. After the first layer has been deposited for each of the multiple connectors, head 205 then emits a second layer of polymeric material 215 upon the already deposited first layer which is then bound to the first layer when cured by lights 241. This layering and curing is repeated many times, for example, with more than fifty layers or head passes, until the connector is fully created.

Material is deposited where computer controller 219 informs head that a wall or other polymeric formation is desired but head will not deposit any material where a bore or other open area is present in the CAD drawing of the connector. The polymeric material is stacked in many layers thereby creating the entire connector as a integral and single piece part in a gaseous, particularly air, environment inside an enclosure of machine 201. In other words, the connectors are all surrounded by air except for the first layer which contacts support surface 203, during the entire manufacturing cycle. As used herein, manufacturing or machine "cycle" refers to the time period from which the head begins depositing the first layer of material until when the head deposits the final layer of material for the completed part and is cured in the machine. After the machine cycle is complete, the user manually removes the manufactured connectors from support surface 203, such as by use of a putty knife or other removal tool. At least forty connectors are made in a single machine cycle, which is preferably less than ninety minutes.

In one optional step, each removed connector is dipped into a hardener, solvent or final curing solution, which also serves to dissolve supports 227, especially when the supports are made of a solvent-dissolvable material, different from the primary material defining walls of the connector. For example with regard to the second preferred embodiment connector valve 131 (see FIG. 6), a connecting support made of a dissolvable material, positions ball 151 relative to body 143 during the simultaneous building up of the ball inside the body. For example, only a pixel or two of material may be needed as the support for the ball. After the final curing and removal from the three-dimensional printing machine 201, the connecting support is dissolved between the ball and body such that the ball can thereafter freely move without requiring any post-manufacturing assembly.

Returning to the manufacture of the first preferred embodiment connector 21, the present three-dimensional printing advantageously builds up seals 57, 71 and 73 essentially simultaneously in the same pass as the adjacent wall is built up for the corresponding male and female end sections 33 and 31. The seals are made of a more flexible, UV curable polymer (for one exemplary configuration, DM 9870 material) as compared to the adjacent rigid wall (for one exemplary configuration, Verogray material). It is noteworthy that the seals are integrally connected and made as a single part with the remainder of connector 21 such that difficult to reach post-manufacturing assembly is not required. The seals can also have a dove tail engagement within an undercut of the adjacent connector wall thereby providing an additional mechanical connection to provide extra durability during repeated mating tube attachment.

As another alternate construction, the present three-dimensional printing process is used to simultaneously manufacture retainer 91 and/or male insert 101 preattached within female end 31 of connector 21. In other words, a single pass of head 205 through a half-section, such as that shown in FIG. 8B, lays down the side wall sections of male insert 101, the snap-fit barbs of retainer 91, the entire longitudinal sidewalls of connector 21 and the side sections of each seal 73, 71 and 53, as the head moves from the right to left ends of the pre-assembled system as illustrated. Due to the many ink jet printing openings in head 205, the male insert, retainer, seals and connector can each be made of a different light curable polymer deposited essentially simultaneously by the head when it is positioned above the connector. The bridging connectors, which may each be only one or two CAD pixels in size, connecting the pre-assembled the male insert, retainer and/or connector components are dissolved during the post-machine cycle washing or dipping step, such that these components are moveable relative to each other thereafter.

Exemplary generic three-dimensional printing machines and materials that can be employed to make connector 21 as specified herein are disclosed in U.S. Patent Publication Nos. 2010/0217429 entitled "Rapid Production Apparatus" which published to Kritchman et al. on Aug. 26, 2010, 2011/0074065 entitled "Ribbon Liquefier for Use in Extrusion-Based Digital Manufacturing Systems" which published to Batchelder et al. on Mar. 31, 2011, and U.S. Pat. No. 7,851,122 entitled "Compositions and Methods for Use in Three Dimensional Model Printing" which issued to Napadensky on Dec. 14, 2010, U.S. Pat. No. 7,369,915 entitled "Device, System and Method for Accurate Printing of Three Dimensional Objects" which issued to Kritchman et al. on May 6, 2008, and U.S. Pat. No. 5,866,058 entitled "Method for Rapid Prototyping of Solid Models" which issued to Batchelder et al. on Feb. 2, 1999. These patent publications and patents are all incorporated by reference herein. A presently preferred machine is the Connex 500 model from Objet Geometries Inc. but may less preferably be a Dimension Elite fused deposition modeling machine from Stratasys, Inc. Nevertheless, it should be appreciated that manufacturing the conduits, connectors and valves disclosed herein by the present three-dimensional printing steps also disclosed herein is a significant leap in technology.

While various embodiments have been disclosed herein, and it should be appreciated that other variations may be employed. For example, pre-assembled or separately printed male and female threaded fittings at the end of a connector, and a tapered lead-in for the seals, such as those disclosed in U.S. patent application Ser. No. 13/023,735, can be simultaneously made by the layering and building up process of three-dimensional printing as discussed herein. It is also envisioned that the actual flow path of the bore within the connector can have a variety of different lengths, bends and shapes, although various advantages of the present connector may not be realized. Furthermore, the moveable ball of the connector valve may alternately be replaced by a different moveable member which can selectively open and close the fluid flow path through the valve, with at least part of the moveable member being manufactured internal to the external wall of the valve. Moreover, the connector can have a T, Y or other configuration, although certain advantages may not be obtained. It should also be realized that while pre-assembled manufacturing is advantageous, the components may be separately manufactured and assembled although many of the present advantages will not be achieved. Additionally, entirely enclosed hollow voids can be designed and manufactured inside thickened walls of the connector in order to save material costs and weight. Nevertheless, such changes, modifications or variations are not to be regarded as a departure from the spirit and scope of the invention.

The invention claimed is:

1. A method of making a conduit adapted for carrying fluid, the method comprising:
    (a) depositing a layer of three-dimensionally printable polymeric material onto a support surface;
    (b) depositing subsequent layers of the material upon each prior layer until the conduit is completely created;
    (c) creating the conduit to comprise a hollow bore extending inside an outer wall made of the material with at least one die-locked bend therein between a female end and a male end of the conduit, as part of the depositing steps;
    (d) surrounding at least a majority of the conduit with a gas during the depositing and creating steps;
    (e) curing the conduit so that the layers of the material bond together; and
    (f) removing the completed conduit from the support surface.

2. The method of claim 1, wherein the conduit is a liquid carrying tube-connector, the method further comprising using the deposited layers to create a female end and an opposite male end of a smaller cross-sectional dimension than the female end.

3. The method of claim 2, further comprising using the deposited layers to create a flexible coupling and a rigid insert substantially simultaneously with the tube connector in the same machine cycle, at least part of the coupling and at least part of the insert being created inside the female end, the insert being hollow, and the insert being removeable from the coupling and female end after the curing.

4. The method of claim 1, wherein the gas is air, the bore inside the conduit includes at least two turns, and the wall is a single piece.

5. A method of making a conduit adapted for carrying fluid, the method comprising:
    (a) depositing a layer of material onto a support surface;
    (b) depositing subsequent layers of the material upon each prior layer until the conduit is completely created;
    (c) creating the conduit to comprise a hollow bore extending inside an outer wall made of the material with at least one die-locked bend therein between a female end and a male end of the conduit, as part of the depositing steps;
    (d) flowing the material from a head positioned above the support surface, at least one of the head and the support surface automatically moving relative to the other according to computer instructions in order to create identical multiples of the conduit in the same machine cycle, free of contraction or expansion due to the manufacture thereof;
    (e) surrounding at least a majority of the conduit with a gas during the depositing and creating steps;
    (f) curing the conduit so that the layers of the material bond together; and
    (q) removing the completed conduit from the support surface.

6. The method of Claim 5, wherein the material is a three-dimensionally printable polymer.

7. A method of making a conduit adapted for carrying fluid, the method comprising:
    (a) depositing a layer of material onto a support surface;
    (b) depositing subsequent layers of the material upon each prior layer until the conduit is completely created;
    (c) creating the conduit to comprise a hollow bore extending inside an outer wall made of the material with at least one die-locked bend therein between a female end and a male end of the conduit, as part of the depositing steps;
    (d) surroundinq at least a majority of the conduit with a gas during the depositing and creating steps;
    (e) curing the conduit so that the layers of the material bond together;
    (f) removing the completed conduit from the support surface; and
    (g) the material being a polymeric string emitted from a moveable head in a continuous manner from a spool which supplies the string to the head.

8. A method of making a conduit adapted for carrying fluid, the method comprising:
    (a) depositing a layer of material onto a support surface;
    (b) depositing subsequent layers of the material upon each prior layer until the conduit is completely created;
    (c) creating the conduit to comprise a hollow bore extending inside an outer wall made of the material with at least one die-locked bend therein between a female end and a male end of the conduit, as part of the depositing steps;
    (d) surrounding at least a majority of the conduit with a qas during the depositing and creating steps;
    (e) curing the conduit so that the layers of the material bond together;
    (f) removing the completed conduit from the support surface; and
    (g) at least ten of the conduits being substantially simultaneously manufactured in a single machine cycle in less than ninety minutes.

9. A method of making a conduit adapted for carrying fluid, the method comprising:
    (a) depositing a layer of material onto a support surface;
    (b) depositing subsequent layers of the material upon each prior layer until the conduit is completely created;
    (c) creating the conduit to comprise a hollow bore extending inside an outer wall made of the material with at least one die-locked bend therein between a female end and a male end of the conduit, as part of the depositing steps;
    (d) flowing the material from an ink jet printing head including openings arranged in a linear array such that multiple material flows are simultaneously occurring for each layer of the conduit
    (e) surrounding at least a majority of the conduit with a gas during the depositing and creating steps;
    (f) curing the conduit so that the layers of the material bond together; and
    (g) removing the completed conduit from the support surface.

10. The method of claim 1, wherein the conduit is a valve comprising a moveable fluid flow-blocking member located at least partially inside the hollow bore, and the member is created substantially simultaneously with the creation of the conduit such that post-curing assembly is not required.

11. The method of claim 1, further comprising creating a seal in the hollow bore integral with the wall by depositing a layer of a second and more flexible material adjacent the material defining the wall, within the same machine cycle.

12. A method of manufacturing a hollow conduit adapted for carrying fluid, the method comprising:
    (a) emitting a first material from at least a first opening in a machine;
    (b) emitting at least a second and different material from at least a second machine opening;
    (c) depositing the materials at desired locations on a support surface of the machine to build up a complete body of the hollow conduit including a through-bore;
    (d) wherein the hollow conduit comprises a first section made of the first material and a second section made of the second material, with the sections being integrally attached together as a single piece by the depositing step; and
    (e) creating a seal in the through-bore integral with the body by depositing the second material, which is more flexible, adjacent the material defining the body, within the same machine cycle.

13. A method of manufacturing a hollow conduit adapted for carrying fluid, the method comprising:
    (a) emitting a first material from at least a first opening in a machine;
    (b) emitting at least a second and different material from at least a second machine opening;
    (c) depositing the materials at desired locations on a support surface of the machine to build up a complete body of the hollow conduit including a through-bore;
    (d) wherein the hollow conduit comprises a first section made of the first material and a second section made of the second material, with the sections being integrally attached together as a single piece by the depositing step;
    (e) wherein the hollow conduit is a liquid carrying tube-connector; and
    (f) creating a female end and an opposite male end of a smaller cross-sectional dimension than the female end from at least one of the deposited materials.

14. The method of claim 13, further comprising using at least one of the deposited materials to create a flexible coupling and a rigid insert substantially simultaneously with the tube connector in the same machine cycle, at least part of the coupling and at least part of the insert being created inside the female end, the insert being hollow, and the insert being removeable from the coupling and female end after curing of the hollow conduit.

15. A method of manufacturing a hollow conduit adapted for carrying fluid, the method comprising:
    (a) emitting a first material from at least a first opening in a machine;
    (b) emitting at least a second and different material from at least a second machine opening;
    (c) depositing the materials at desired locations on a support surface of the machine to build up a complete body of the hollow conduit including a through-bore;
    (d) wherein the hollow conduit comprises a first section made of the first material and a second section made of the second material, with the sections being integrally attached together as a single piece by the depositing step; and
    (e) flowing the materials from an ink jet printing head including multiples of the openings being arranged in a linear array such that the materials simultaneously flow for each layer of the hollow conduit.

16. A method of manufacturing a hollow conduit adapted for carrying fluid, the method comprising:
    (a) emitting a first material from at least a first opening in a machine;
    (b) emitting at least a second and different material from at least a second machine opening;
    (c) depositing the materials at desired locations on a support surface of the machine to build up a complete body of the hollow conduit including a through-bore;
    (d) wherein the hollow conduit comprises a first section made of the first material and a second section made of the second material, with the sections being integrally attached together as a single piece by the depositing step; and
    (e) flowing the materials from a head positioned above the support surface, at least one of the head and the support surface automatically moving relative to the other according to computer instructions in order to create identical multiples of the hollow conduit in the same manufacturing cycle of the machine, free of part-to-part tolerance differences.

17. A method of manufacturing a hollow conduit adapted for carrying fluid, the method comprising:
    (a) emitting a first material from at least a first opening in a machine;
    (b) emitting at least a second and different material from at least a second machine opening;
    (c) depositing the materials at desired locations on a support surface of the machine to build up a complete body of the hollow conduit including a through-bore;
    (d) wherein the hollow conduit comprises a first section made of the first material and a second section made of the second material, with the sections being integrally attached together as a single piece by the depositing step; and
    (e) wherein the materials are three-dimensionally printable polymers.

18. A method of manufacturing a hollow conduit adapted for carrying fluid, the method comprising:
    (a) emitting a first material from at least a first opening in a machine;
    (b) emitting at least a second and different material from at least a second machine opening;
    (c) depositing the materials at desired locations on a support surface of the machine to build up a complete body of the hollow conduit including a through-bore;
    (d) wherein the hollow conduit comprises a first section made of the first material and a second section made of the second material, with the sections being integrally attached together as a single piece by the depositing step; and
    (e) wherein at least ten of the hollow conduits are substantially simultaneously manufactured in the machine in less than ninety minutes.

19. The method of claim 12, wherein the hollow conduit is a valve comprising a moveable fluid flow-blocking member located at least partially inside the through-bore, and the member is created substantially simultaneously with the creation of the hollow conduit such that post-curing assembly is not required.

20. The method of Claim 17, further comprising creating a seal in the through-bore integral with the body by depositing the second material, which is more flexible, adjacent the material defining the body, within the same machine cycle.

21. The method of claim 12, wherein the hollow conduit is substantially surrounded by a gas while the depositing step occurs.

22. The method of Claim 17, wherein the first section is more flexible than the second section.

23. A method of using a three-dimensional printing machine, the method comprising:
   (a) emitting material from an ink jet printing head of the machine;
   (b) building up a fluid carrying conduit by placing the material to define an elongated and hollow body, the fluid carrying conduit being a liquid carrying tube-connector;
   (c) creating a female end and a male end of the connector, the mail end being of a smaller cross-sectional dimension than the female end; and
   (d) curing the fluid carrying conduit with light as the conduit is being built up.

24. The method of claim 23, further comprising building up the fluid carrying conduit on a layer by layer basis, the machine further comprising a support surface upon which the material is built up, and at least one of the head and the support surface moving relative to the other to create each layer with a movement pass.

25. The method of claim 23, wherein the material is a three-dimensionally printable polymer.

26. The method of claim 23, wherein the material is a polymeric string supplied to the head by a spool.

27. The method of claim 23, further comprising flowing the material from the ink jet printing head through openings arranged in a linear array such that multiple material flows are simultaneously occurring for each layer of the fluid carrying conduit.

28. A method of using a three-dimensional printing machine, the method comprising:
   (a) emitting material from an ink jet printing head of the machine;
   (b) building up a fluid carrying conduit by placing the material to define an elongated and hollow body;
   (c) curing the fluid carrying conduit with light as the conduit is being built up;
   (d) wherein the fluid carrying conduit is a valve comprising a moveable fluid flow-blocking member located at least partially inside the hollow body; and
   (e) the member being created substantially simultaneously with the creation of the fluid carrying conduit such that post-curing assembly is not required.

29. A method of using a three-dimensional printing machine, the method comprising:
   (a) emitting material from an ink let printing head of the machine;
   (b) building up a fluid carrying conduit by placing the material to define an elongated and hollow body;
   (c) creating a seal inside the hollow body integral with the conduit by depositing a second and more flexible material adjacent the material defining the body, within the same machine cycle; and
   (d) curing the fluid carrying conduit with light as the conduit is being built up.

30. A method of making a functional quick connector adapted to carry fluid therethrough, the method comprising:
   (a) emitting at least one three-dimensionally printable polymer from at least one ink jet printer opening to create an enlarged female end section of the quick connector;
   (b) creating a male end section of the quick connector from the at least one three-dimensionally printable polymer;
   (C) creating a middle section with at least one bend in an internal bore between the ends from the at least one three-dimensionally printable polymer; and
   (d) emitting a different three-dimensionally printable polymer from the at least one ink jet printer opening to create a seal integrally attached to at least one of the sections.

31. The method of claim 30, further comprising creating a flexible coupling at least partially within one of the sections of the quick connector.

32. The method of claim 30, further comprising creating a male insert within the female section of the quick connector during the creation of the quick connector, the male insert having a through-bore and being removeable from the female section after the quick connector and male insert are cured.

33. The method of claim 30, further comprising creating sharp angled and die-locked corners in the quick connector.

34. The method of claim 31, further comprising coupling tubes to the end sections of the quick connector, flowing pressurized fluid of at least five bar through the quick connector, and the quick connector withstanding at least two hundred pounds of extraction force with regard to the tubes, without failure.

35. The method of claim 30, further comprising flowing the polymer from a head positioned above a support surface, at least one of the head and the support surface automatically moving relative to the other according to computer instructions in order to create multiples of the quick connector in the same manufacturing cycle.

36. The method of claim 30, further comprising curing the polymers with light as the polymer is built up to create the sections.

37. The method of claim 30, further comprising manufacturing at least ten of the quick connectors during a machine cycle within ninety minutes.

38. The method of claim 30, further comprising building up the quick connector on top of a stationary machine support surface, on a layer by layer basis.

39. The method of claim 30, wherein the quick connector is substantially surrounded by a gas while the using steps occur.

40. A method of making a functional fluid valve, the method comprising:
   (a) emitting at least one three-dimensionally printable polymer from at least one ink jet printer opening to create a body section of the valve between open end sections, a bore extending through the sections; and
   (b) creating a fluid flow-blocking member located at least partially inside the body section from the at least one three-dimensionally printable polymer, the member being created substantially simultaneously with the creation of an adjacent portion of the body section; and
   (c) creating the member relative to the sections during their manufacture so that the member is selectively moveable after the manufacture to block and open the bore in at least one valve operating condition.

41. The method of claim 40, wherein the valve is a one-way flow restricting valve.

42. The method of claim 40, further comprising creating the member within the body before the sections having been completely created.

43. The method of claim 40, further comprising making the member larger than any external opening in the sections to prevent the member from being removed from the valve.

44. The method of claim 40, wherein the member includes a round ball and the end sections each comprise a frusto-conical external shape adapted to receive a flexible tube thereon.

45. The method of claim 1, wherein the conduit is an automotive vehicle quick connector adapted to connect multiple air conditioning, brake fluid or fuel tubes.

46. The method of claim 5, wherein the conduit is an automotive vehicle quick connector adapted to connect multiple air conditioning, brake fluid or fuel tubes.

47. The method of claim 7, wherein the conduit is an automotive vehicle quick connector adapted to connect multiple air conditioning, brake fluid or fuel tubes.

48. The method of claim 8, wherein the conduit is an automotive vehicle quick connector adapted to connect multiple air conditioning, brake fluid or fuel tubes.

49. The method of claim 9, wherein the conduit is an automotive vehicle quick connector adapted to connect multiple air conditioning, brake fluid or fuel tubes.

50. The method of claim 12, wherein the conduit is an automotive vehicle quick connector adapted to connect multiple air conditioning, brake fluid or fuel tubes.

51. The method of claim 13, wherein the conduit is an automotive vehicle quick connector adapted to connect multiple air conditioning, brake fluid or fuel tubes.

52. The method of claim 15, wherein the conduit is an automotive vehicle quick connector adapted to connect multiple air conditioning, brake fluid or fuel tubes.

53. The method of claim 16, wherein the conduit is an automotive vehicle quick connector adapted to connect multiple air conditioning, brake fluid or fuel tubes.

54. The method of claim 17, wherein the conduit is an automotive vehicle quick connector adapted to connect multiple air conditioning, brake fluid or fuel tubes.

55. The method of claim 18, wherein the conduit is an automotive vehicle quick connector adapted to connect multiple air conditioning, brake fluid or fuel tubes.

56. The method of claim 23, wherein the conduit is an automotive vehicle quick connector adapted to connect multiple air conditioning, brake fluid or fuel tubes.

57. The method of claim 29, wherein the conduit is an automotive vehicle quick connector adapted to connect multiple air conditioning, brake fluid or fuel tubes.

58. The method of Claim 29, wherein the fluid carrying conduit is a liquid carrying tube-connector, the method further comprising using the material to create a female end and a male end of a smaller cross-sectional dimension than the female end.

59. The method of claim 58, further comprising using the material to create a flexible coupling and a rigid insert substantially simultaneously with the connector in the same machine cycle, at least part of the coupling and at least part of the insert being created inside the female end, the insert being hollow, and the insert being removeable from the coupling and female end after the curing.

* * * * *